United States Patent [19]

Taghezout

[11] Patent Number: 5,216,310

[45] Date of Patent: Jun. 1, 1993

[54] AXIAL FLUX ELECTROMAGNETIC MICROMOTORS

[75] Inventor: Daho Taghezout, Lausanne, Switzerland

[73] Assignee: ETA SA Fabriques d'Ebauches, Granges, Switzerland

[21] Appl. No.: 869,820

[22] Filed: Apr. 13, 1992

[30] Foreign Application Priority Data

Apr. 11, 1991 [FR] France .................. 91 04559

[51] Int. Cl.$^5$ .............................................. H02K 1/22
[52] U.S. Cl. ..................... 310/268; 310/40 MM; 310/90; 310/114; 310/156
[58] Field of Search ............... 310/268, 40 MM, 90, 310/157, 179, 114, 156, 254; 384/285, 537, 912

[56] References Cited

U.S. PATENT DOCUMENTS

| | | | |
|---|---|---|---|
| 4,181,867 | 1/1980 | Muller | 310/156 |
| 4,211,963 | 7/1980 | Muller | 310/268 |
| 4,594,524 | 6/1986 | Sudo | 310/268 |
| 4,839,551 | 6/1989 | Tomisawa | |
| 4,902,923 | 2/1990 | Okauchi | 310/268 |
| 4,907,897 | 3/1990 | Shirotori | 384/912 |
| 4,949,000 | 8/1990 | Petersen | 310/179 |
| 4,987,333 | 1/1991 | Noguchi | 310/268 |
| 5,099,162 | 3/1992 | Sawada | 310/156 |
| 5,109,171 | 4/1992 | Schmider | 310/156 |
| 5,124,604 | 6/1992 | Swartz | 310/268 |

FOREIGN PATENT DOCUMENTS

| | | | |
|---|---|---|---|
| 0660144 | 3/1963 | Canada | 310/268 |
| 2610219 | 9/1976 | Fed. Rep. of Germany | 310/268 |
| 0646118 | 9/1962 | Italy | 310/268 |
| 668160 | 6/1989 | Switzerland | |

OTHER PUBLICATIONS

Patent Abstracts of Japan, vol. 11, No. 204, Jul. 2, 1987.
Patent Abstracts of Japan, vol. 12, No. 498, Dec. 26, 1988.

Primary Examiner—R. Skudy
Attorney, Agent, or Firm—Weil, Gotshal & Manges

[57] ABSTRACT

An axial flux electromagnetic micromotor is described. The micromotor has a stator, a rotor which is pivotally mounted in relation to the stator about an axis of rotation, the rotor having at least one pair of magnetic poles producing in an air gap a magnetic field substantially parallel to the axis of rotation and at least one substantially planar coil situated in the air gap in such a way as to intercept a flux created by the field, this micromotor having an air gap that is solely delimited by the rotor. The micromotor can be used to drive a mechanism.

11 Claims, 2 Drawing Sheets ic # AXIAL FLUX ELECTROMAGNETIC MICROMOTORS

FIELD OF THE INVENTION

The instant invention relates to an axial flux electromagnetic micromotor and, more specifically, to a miniaturized stepping micromotor.

DESCRIPTION OF THE PRIOR ART

A micromotor of the above mentioned type is already known, notably from Swiss patent No. 668,160, which has a stator in relation to which a magnetized rotor is pivotally mounted about an axis of rotation. This rotor has at least one pair of magnetic poles that produces a magnetic field in an air gap which is substantially parallel to said axis of rotation of the rotor. This micromotor also comprises at least one substantially planar coil situated in said air gap, perpendicular to the axis of rotation, in such a manner as to intercept the flux created by the field. According to this specification, the coil is disposed on one face of a semiconductor wafer and is manufactured using conventional integrated circuit manufacturing technology. In this type of motor, the air gap is defined by two parallel flanges of high magnetic permeability, the one being integral with the rotor whereas the other is securely mounted on the stator. During operation, the magnetic flux set up by the magnetized rotor and by the coil or coils respectively circulates between the two flanges which are mutually rotatable. The design of this creates frictional forces associated with the magnetic attraction which reduce the output of the micromotor.

OBJECT OF THE INVENTION

It is therefore an object of the invention to overcome this disadvantage by providing a high output electromagnetic micromotor, the structure of which is particularly well suited to miniaturized micromotor manufacturing technology.

The object of the invention is therefore an axial flux electromagnetic micromotor of the type comprising:
 a stator
 a magnetized rotor pivoting about an axis of rotation in relation to the stator, this rotor having at least one pair of magnetic poles producing in an air gap a magnetic field substantially parallel to said axis of rotation of the rotor, and
 at least one substantially planar coil situated in said air gap, perpendicularly to the axis of rotation, so as to intercept a flux created by the field, the air gap in this micromotor being delimited solely by the rotor.

As a result of this characteristic, the two flanges can turn in concomitant manner, thereby eliminating the magnetic friction phenomena between these flanges.

BRIEF SUMMARY OF THE INVENTION

According to a preferred feature of the invention, this micromotor which has a first and a second magnetic permeability flange, the first of which is mechanically integral with the rotor, also has a second flange which is also mechanically integral with the rotor, defining said air gap with the first flange.

According to another embodiment of the invention, the two flanges are rendered integral with the rotor by the intermediary of, respectively, a first and a second sleeve which are both freely rotatably mounted on a pin.

BRIEF DESCRIPTION OF THE DRAWINGS

Other features and advantages of the invention will emerge from the following description of non-limiting embodiments with reference to the accompanying drawings in which.

DETAILED DESCRIPTION OF THE INVENTION

Figure 1:
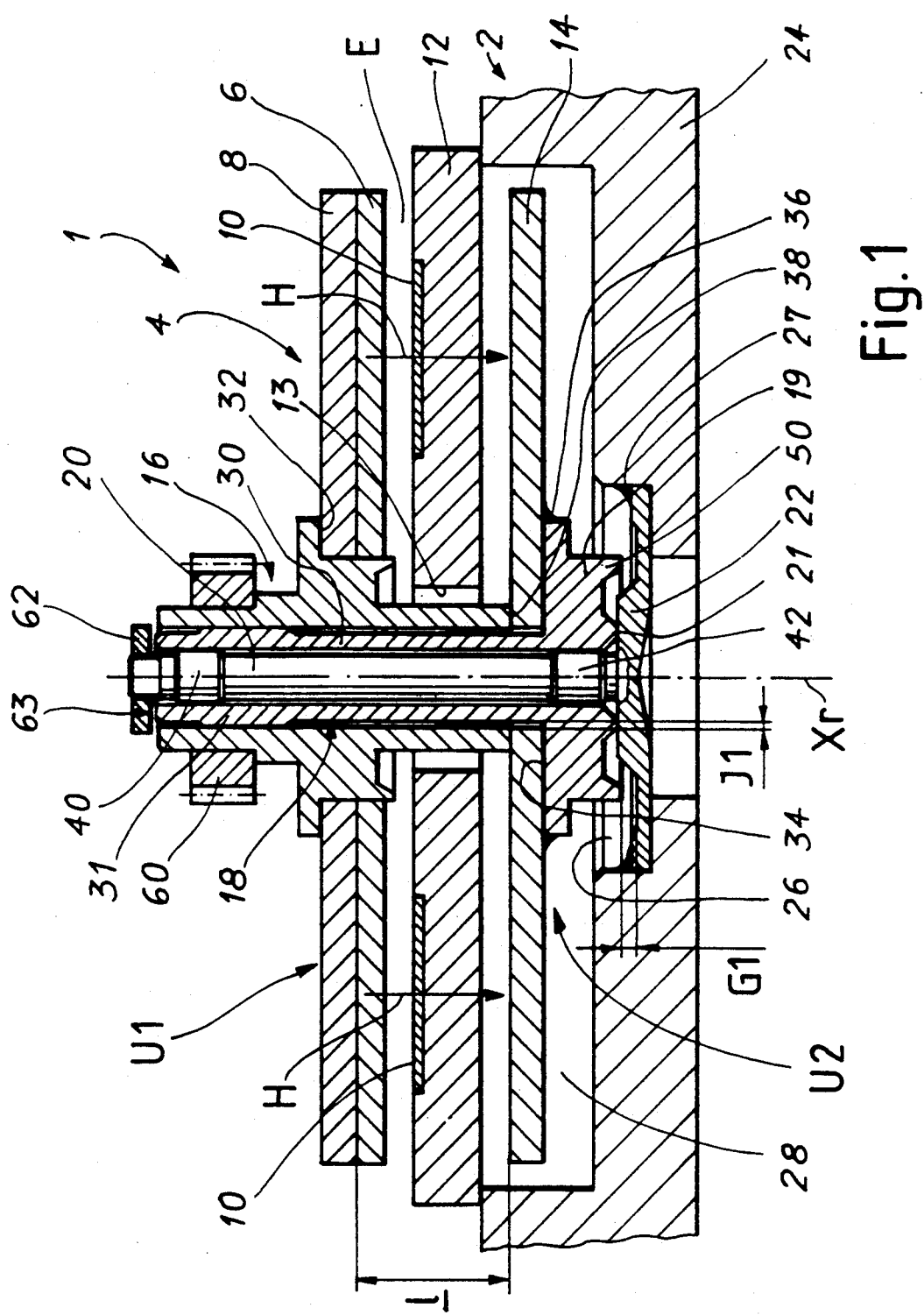
FIG. 1 shows a longitudinal section of an electromagnetic micromotor according to a first embodiment of the invention.
Figure 2:
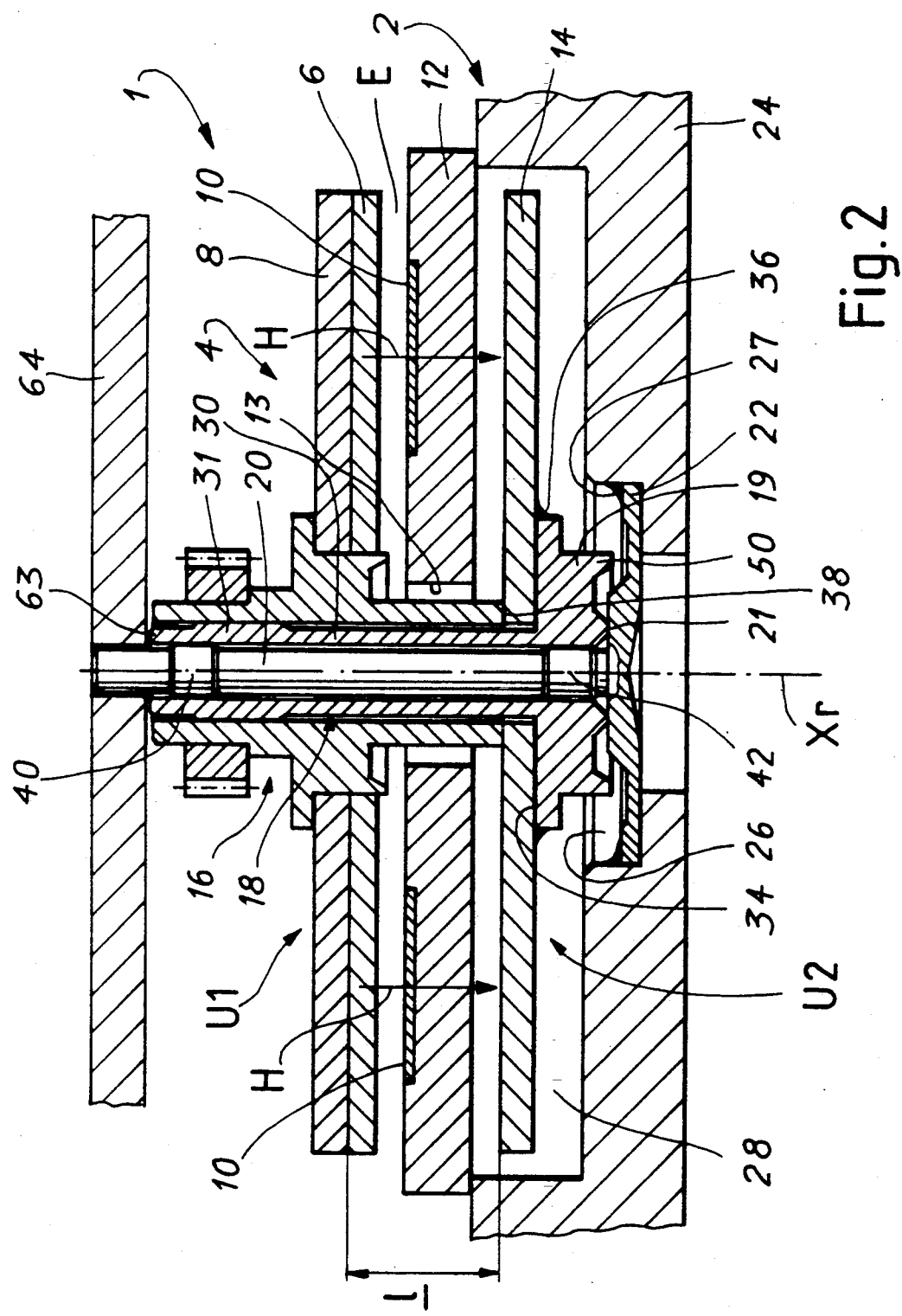
FIG. 2 is a similar view to FIG. 1, but showing a second embodiment of the invention.

Referring to FIGS. 1 and 2, these show an axial flux electromagnetic micromotor generally designated with the reference numeral 1.

This micromotor 1 has a stator 2 and a magnetized rotor 4 which is pivotally mounted about a geometric axis of rotation Xr, in relation to the stator 2. The rotor 4 has at least one pair of magnetic poles (not shown in the figure) producing in an air gap E a magnetic field H substantially parallel to said axis of rotation Xr of the rotor 4. For this purpose the rotor 4 is composed of a circular magnetized disc 6 and of a first flange 8 of high magnetic permeability. Reference is made to the above mentioned Swiss patent for details of the construction of the disc 6 and of the flange 8. The motor also has substantially planar coils 10. These coils are placed in said air gap E perpendicularly to the axis of rotation Xr in such a way as to intercept a flux created by the field H. The coils 10 are disposed on a substrate 12 made of an electrically insulating material such as a semiconductor material made of silicon and having in its centre, coaxially to the axis of rotation Xr, a discharge boring 13. Here, too, the structure of the coils is identical to those described in the above mentioned patent specification.

According to the invention the micromotor has a second flange 14 of high magnetic permeability, preferably made, as is the first flange 8, of a soft magnetic material. This second flange 14 is located opposite the free face of the disc 6 and is mechanically integral with the rotor 4. The air gap E is thus defined by the two flanges 8 and 14 which are both integral with the rotor 4 and which are capable of moving in concomitant manner in relation to the stator 2 while the micromotor is working, in other words, when a current passes through the planar coils 10. It will be understood that the air gap E is only delimited by the rotor 4 because it is defined by the two mobile flanges 8 and 14 which form an integral part of the rotor 4.

According to another feature of the invention, the two flanges 8 and 14 are rendered integral with the rotor 4 by the intermediary of respectively a outer sleeve 16 and a inner sleeve 18 freely rotatably mounted on a pin 20. The inner sleeve 18 which is directly mounted on the pin 20 has, at its lower part and considering the micromotor of the invention in the position as shown in FIG. 1, a base 19 which rests by axial contact, that is parallel to the axis of rotation Xr, on a pedestal 22 integral with the pin 20. For this purpose, the base 19 has opposite the pedestal 22 a first circular collar 21, termed the inner collar. This inner collar 21 has a friction surface resting directly on the pedestal 22. The pin 20 extends perpendicularly to the pedestal 22 and is of the same material. The pedestal 22 is housed in a support 24. The support 24 is preferably made of a nonmagnetic material such as brass and it has two stepped recesses 26 and 28, the dimensions and shapes of which are designed to receive respectively at least the pedestal 22 and the second flange 14. These recesses 26 and 28 in which are lodged the pedestal 22, as well as at least for each one part of the base 19 and the second flange 14, are covered by the substrate 12 the outer rim of which rests on an upper face of the support 24, near to a cylindrical wall which delimits the recess 28.

It will be noted that the pin 20 is fixed in relation to the support 24 because the pedestal 22 is securely retained in the bottom of the recess 26 by a weld 27.

The two sleeves 16 and 18 are coaxially shrunk and are preferably driven one onto the other. More specifically, the sleeve 16 which is the outermost one in relation to the axis of rotation Xr is driven directly onto the inner sleeve 18. The inner 18 has a body 30 which rises from the base 19. A bearing surface 31 is disposed at the distal part of the body 30, in relation to the base 19, the outer diameter of which is slightly greater than that of the body 30, permitting the outer sleeve 16 to be forcibly mounted onto the inner sleeve 18 over a relatively small engagement length.

The pin 20 as well as the sleeves 16 and 18 pass right through the semiconductor substrate 12 via the intermediary of the discharge boring 13.

The sleeves 16 and 18 have shoulders 32 and 34 respectively on which flanges 8 and 14 respectively rest. In the embodiment shown, the magnetized circular disc 6 has been advantageously driven onto the outer sleeve 16 in such a manner that the first flange 8 is sandwiched between the shoulder 32 and the magnetized circular disc 6. The outer sleeve 16, the first flange 8 and the magnetized circular disc 6 form a unit U1 which can be preassembled and then mounted on the body 30 of the inner sleeve 18, already positioned on the pin 20.

It should be noted that before being mounted on the pin 20, the inner sleeve 18 can be preassembled with the second flange 14 by means of a glued joint 36 which keeps the parts together at least during preassembly. The inner sleeve 18 and the second flange 14 also form a unit U2.

As regards the second flange 14, this is mounted with a radial play J1 on the body 30 of the inner sleeve 18 and it rests directly on the shoulder 34. In addition, the second flange 14 is held on the inner sleeve 18 by one of the free extremities, with reference numeral 38, of the outer sleeve 16. It will thus be understood that the second flange 14 is sandwiched between the free extremity 38 of the outer sleeve 16 and the shoulder 34 of the inner sleeve 18. It will be noted that the shoulder 34 is directly disposed on the base 19. Abutting against the second flange 14, the free extremity 38 of the outer sleeve 16 delimits a width l of the air gap E.

The pin 20 has two bearing surfaces 40 and 42 respectively distal and proximal in relation to the pedestal 22 and on which the inner sleeve 18 is directly mounted in free rotation. More specifically, the proximal bearing surface 42 is disposed in the vicinity of the pedestal 22 and the distal bearing surface 40 is disposed in the vicinity of the free extremity of the pin 20.

It will be noted that the pin 20 extends over the entire length of the inner sleeve 18, and even therebeyond, and that it thus passes through the entire rotor 4. A design of this kind notably makes it possible to ensure the accurate assembly and guiding of the rotor 4.

In addition, the base 19 has, opposite the pedestal 22, a second circular collar 50 which is adapted to come into contact with the pedestal 22 should the pin 20 bend. This second collar 50 is coaxial to the first circular collar 21, and it is disposed around the latter. In relation to the axis of rotation Xr, the two coaxial collars 21 and 50 are disposed on the inside and outside respectively. The guard G1 between this peripheral collar 50 and the pedestal 22 is calculated in such a way that the bending of the pin 20 remains within the limit of resilient bending strength and that neither the flange 14 nor the magnetized disc 6 can rub against the substrate 12.

To transmit the couple supplied by the micromotor 1 of the invention, a pinion 60 is driven onto the outer sleeve 16, in the vicinity of its free extremity which projects outside the micromotor 1. It should be noted that this pinion 60 could be directly provided by machining from the material on the outer sleeve 16.

In accordance with the embodiment shown in FIG. 1, the axial displacement of the mobile element formed by the two sleeves 16 and 18 provided with the flanges 8 and 14 and of the magnetized disk 6 is limited by a stop formed by a threaded ring 62 screwed onto the free extremity of the pin 20. The ring 62 can be driven on the pin 20 or it can be fixed in conventional manner, not shown, such as a counter-screw or a crimp. It will be noted that the body 30 of the inner sleeve 18 projects substantially from the outer sleeve 16 in the vicinity of the free extremity of the pin 20. As a result, the inner sleeve 18 has a free projecting extremity which forms a support 63 capable of coming into axial contact with the threaded ring 62.

In the embodiment of FIG. 2, the free extremity of the pin 20 is engaged in a plate 64, such as a train bar. It will be noted that the pin 20 is fixed in relation to the plate 64, these two elements displaying no relative movement. The axial stop in this example is provided by the plate 64 itself against one face of which the support part 63 of the second sleeve 18 can rest.

I claim:

1. An axial flux electromagnetic micromotor of the type comprising:
    a stator,
    a magnetized rotor pivotally mounted for rotation in relation to the stator about an axis of rotation, said rotor having at least one pair of magnetic poles for producing a first magnetic field substantially parallel to said axis of rotation,
    said stator comprising at least one substantially planar coil extending perpendicular to the axis of rotation for producing a second magnetic field in such a way as to interact with said first magnetic field,
    a pin fixedly secured to the stator and projecting vertically therefrom for defining along its length said axis of rotation,
    said rotor further comprising a first and a second flange mounted perpendicular to said axis of rotation, and an outer and an inner sleeve engaging respectively said first and second flanges for defining therebetween an air gap, wherein said inner sleeve is rotatably mounted around said pin and extends substantially over the length thereof, said outer sleeve being coaxially fitted directly around the periphery of said inner sleeve to form therewith a mobile integral assembly having said flanges positioned parallel to one another.

2. A micromotor according to claim 1 wherein the inner and outer sleeves are coaxially shrunk.

3. A micromotor according to claim 1 wherein the outer sleeve is driven onto the inner sleeve.

4. A micromotor according to claim 1 wherein said pin has two bearing surfaces distal and proximal respectively on which the inner sleeve is freely rotatably mounted.

5. A micromotor according to claim 1 wherein the outer and inner sleeves comprise respectively shoulders on which the flanges rest.

6. A micromotor according to claim 1 wherein the second flange is maintained on the inner sleeve by a free extremity of the outer sleeve.

7. A micromotor according to claim 6 wherein the free extremity of the outer sleeve rests against the second flange and delimits a width of said air gap.

8. A micromotor according to claim 7 further including a support means engaged to the stator, and wherein the inner sleeve comprises a base which rests by axial contact on said support means, said base having a shoulder bearing said second flange.

9. A micromotor according to claim 1 wherein said planar coil is disposed on a substrate having a central discharge bore, the pin as well as both inner and outer sleeves passing entirely through said discharge bore.

10. A micromotor according to claim 1 further including a train bar plate, said pin having a free extremity engaging said train bar plate.

11. A micromotor according to claim 10 wherein said train bar plate acts as an axial stop against which the inner sleeve is able to rest.

* * * * *